(12) United States Patent
Sigona

(10) Patent No.: US 7,507,334 B1
(45) Date of Patent: Mar. 24, 2009

(54) WATER TREATMENT SYSTEM

(76) Inventor: Jon-Andrew Vincent Sigona, 7335 E. Acoma Dr., Suite 204, Scottsdale, AZ (US) 85260

( * ) Notice: Subject to any disclaimer, the term of this patent is extended or adjusted under 35 U.S.C. 154(b) by 0 days.

(21) Appl. No.: 11/999,438

(22) Filed: Dec. 3, 2007

(51) Int. Cl.
*B01D 33/00* (2006.01)
(52) U.S. Cl. ..................................................... 210/196
(58) Field of Classification Search ................... 210/196
See application file for complete search history.

(56) References Cited

U.S. PATENT DOCUMENTS 7,303,666 B1 * 12/2007 Mitsis ........................ 210/106

* cited by examiner

*Primary Examiner*—Chester T Barry

(57) ABSTRACT

The water treatment system is a modular-filter based residential reverse osmosis (RO) system that remineralizes the purified water twice to ensure the water is alkaline, but uses only one remineralization filter. The system forces the water to undergo remineralization twice in a modular-filter based residential RO system, using only one remineralization filter. The water produced from the water treatment system is alkaline with a pH of at least 7.5 up to a maximum pH of 8.5. A pH of 8.0 is the mean average.

5 Claims, 3 Drawing Sheets

Tap Master Artesian Full Contact

Fig. 2, Tap Master Artesian Full Contact

WATER TREATMENT SYSTEM

BACKGROUND OF INVENTION

The Tap Master Artesian Full Contact is a modular-filter based reverse osmosis system with a forced remineralization system whereby the purified water is channeled through the same remineralization cartridge twice to ensure the water has a pH of between 7.5 and 8.5 with 8.0 being the mean average. Reverse osmosis systems with normal remineralization will only adjust the pH up to 7.0, such as found on our current production modular-filter based reverse osmosis system—the Tap Master Artesian. Remineralizing RO water is not new—we have been doing for years, and neither is using a modular-filter based RO system. What is new is the "Full Contact" set-up by which we force the purified water through one remineralization cartridge twice, and using it on a modular-filter based platform. Our search revealed no existing products or patents related to the use of our Full Contact forced double remineralization system used in conjunction with a modular-filter based RO system.

The major significant difference between a canister filter based RO system, and a modular filter based RO system is that the canister filter based RO system uses canister filter housings with replaceable filter elements. The filters are changed periodically, but the canister filter housings remain. The owner's manuals of these types of systems urge the user to replace the canister filter housings regularly, usually about once every 5 years, however the vast majority of users do not do this, and the housings weaken and burst with age potentially causing significant water damage to the user's residence or workplace. Our system—The Tap Master Series reverse osmosis systems—a modular filter based RO system—uses modular filters, where the filter and its housing are molded together and both together are replaced annually or as needed. This prevents the possibility of the filter housing aging and bursting as with the canister filter based system.

FIG. 1 shows a sediment filter 1, carbon filter 2, RO membrane 3, carbon/remineralization filter 4, and storage tank 5.

The coffee industry has long used remineralization of reverse osmosis water in home use products aimed towards the coffee aficionado's home systems. However those systems could only reliably raise the pH to 7.0; or used multiple remineralization filters to achieve a higher pH; and/or were based on canister-filter based RO systems. For example: we offer our Tap Master Series modular-filter based reverse osmosis system with an Artesian upgrade—essentially adding a modular remineralization filter to the system to reliably raise the pH to 7.0. The system we present to you here—The Tap Master Artesian Full Contact forces the water through the same remineralization filter a second time before it is dispensed through the use of a tubing loop, some tee fittings and check valves to reliably raise the pH to 7.5 to 8.5 with 8.0 as the average.

BRIEF SUMMARY OF THE INVENTION

The object of the invention is to produce purified water with a pH of 8.0 from a reverse osmosis system without the inherent liability of the canister filter based reverse osmosis system, and without using multiple remineralization filters. Furthermore, the object of the invention is also to produce purified water with a pH of 8.0 from a reverse osmosis system with the inherent benefits of modular filter based reverse osmosis system, and without using multiple remineralization filters.

The water enters the first modular sediment filter which removes sediment particles down to 5 microns; then passes into a modular coconut shell carbon fitter which removes chlorine and 14,000 other chemicals; and on to the reverse osmosis membrane where the water is effectively stripped of total dissolved solids, including minerals. This ultra-pure low pH water (pH 6.2-6.8) is then passed through a combination coconut shell carbon and remineralization filter raising the pH to 7.0 on its way to a storage tank for storage, until a user opens a faucet creating a demand. Once the water is demanded it leaves the storage tank, is channeled back through the same combination coconut shell carbon and remineralization filter a second time through the use of check valves to raise the pH to 8.0 before it is dispensed. Other modular filters can be added to the system, such as an ultra-violet light filter to destroy microorganisms, or iron-reducing filter, to provide additional protection, but they will not depart from the modular-filter based platform used in combination with the Full Contact forced double remineralization of this utility patent. The combination of the "Full Contact forced double remineralization" built on the "modular-filter based reverse osmosis system" platform is the heart of the innovation presented here.

Step 1: Water from RO system, pH6.5 enters Carbon/Remineralization filter.

Step 2: Water flows through Carbon/Remineralization filter, and exits filter with pH7.0.

Step 3: Water flows through Check Valve "A" Into Storage Tank.

Step 4: Upon demand, water flows from Storage Tank through Check Valve "B" and enters Carbon/Remineralization filter.

Step 5: Water flows through Carbon/Remineralization filter, and exits with pH8.0.

NOTE: Check Valve "A" prevents the water from the storage tank from bypassing the Carbon/Remineralization filter upon demand. Instead it forces the water back through the Carbon/Remineralization filter a second time raising its pH from 7.0 to 8.0.

NOTE: Check Valve "B" prevents water from the RO (pH 6.5) from going directly to the storage tank and by-pass the Carbon/Remineralization filter. Instead it forces the water to flow through the Carbon/Remineralization filter raising the pH.

DETAILED DESCRIPTION OF THE INVENTION

Figure 1:
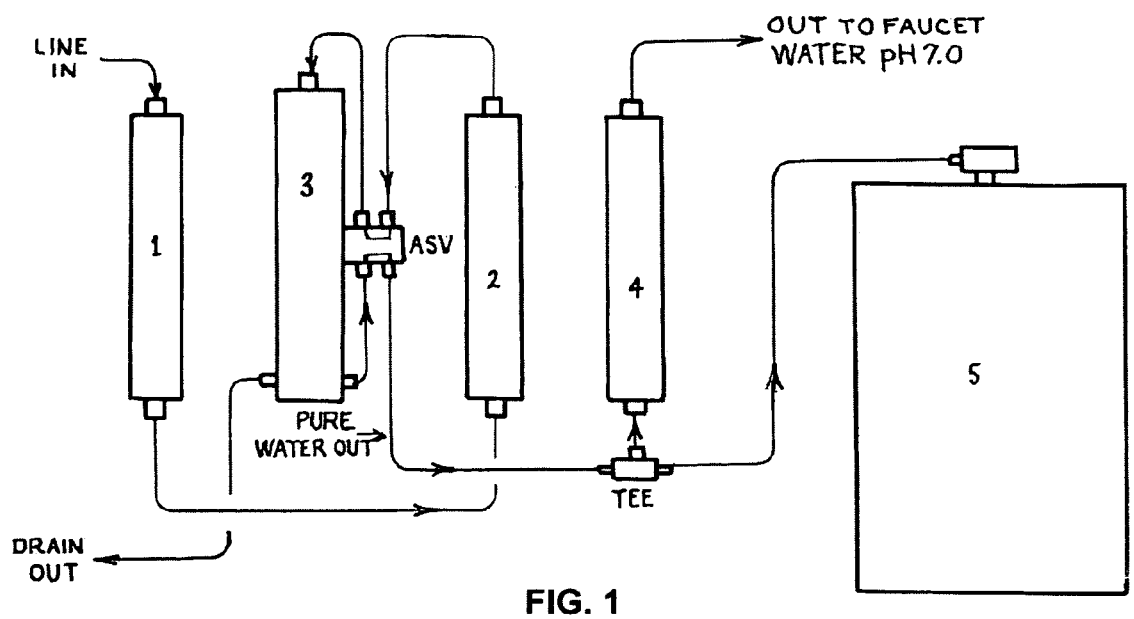
FIG. 1 shows the original prior art Tab Master Artesian.
Figure 2:
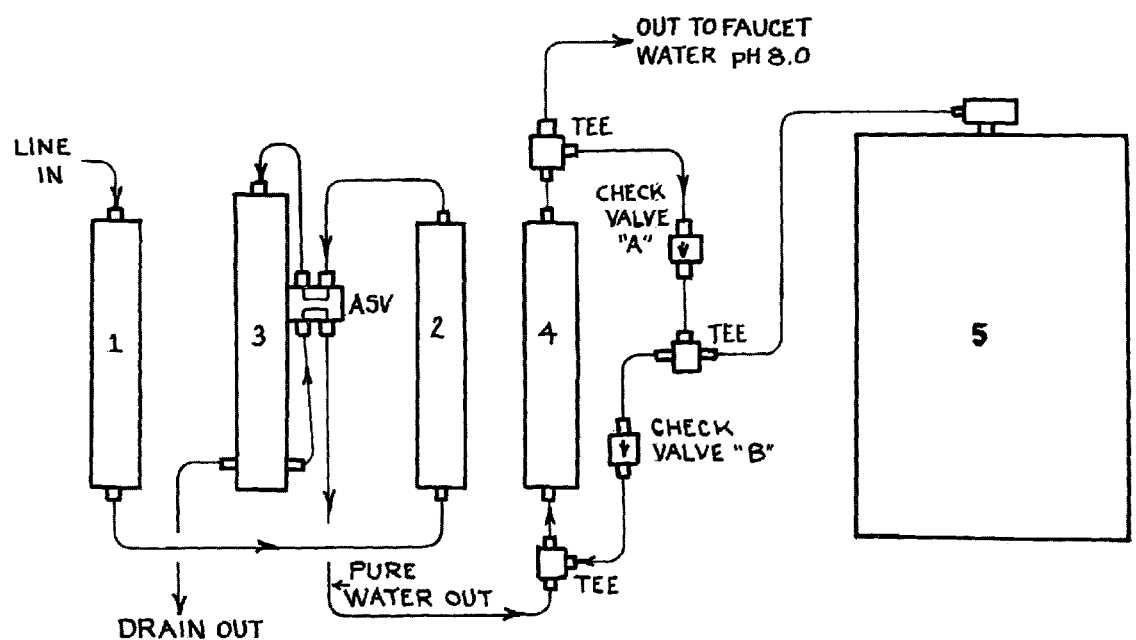
FIG. 2 shows the "Full Contact forced double remineralizabon" system added to the original Tap Master Artesian so that it becomes the Tap Master Artesian Full Contact.

FIG. 2 shows a sediment filter 1, carbon filter 2, RO membrane 3, carbon/remineralization filter 4, storage tank 5, and a recirculation line having check valve "A" and check valve "B". The storage tank is connected to the recirculation line between the check valves Explanation of the Invention: The Tap Master Artesian Full Contact is a modular filter based reverse osmosis system which first strips the water clean of 98% total dissolved solids including minerals, then remineralizes the water twice, to add minerals to the water in order to raise its pH to 8.0 on average making the water alkaline. Passing the water from a potable municipal or well water supply through a sediment filter, coconut shell carbon filter, and the reverse osmosis filter removes on average 98% of sediment, chlorine and most common chemicals found in our municipal water supply and dissolved solids and will drop the water's pH to between 6.2-6.8. The water is very pure at this point and will have only 5-15 parts per million of total dissolved solids. The water then passes through a remineralization filter containing the mineral calcite. The acidic water dissolves some of the calcite raising the water's pH to 7.0 on average, and raising the amount of total dissolved solids to 30 on average. The water is then diverted into a storage tank until the opening of a faucet creates a demand on the system. When the faucet is opened and a demand is created the water is then forced through the same remineralization filter by the use of two check valves. The check valves also serve to prevent to water from bypassing the remineralization filter entirely. After the water passes through the remineralization filter the second time its pH will be raised to between 7.5-8.5 with 8.0 as the average and containing 60 parts per million of total dissolved solids on average. IMPORTANT NOTE: the first 6 gallons of water produced from the Tap Master Artesian Full Contact following the initial start-up are not meant to be consumed. The user is instructed to flush out the system and run the water into the drain. The pH will be much higher than normal, contain loose carbon, and a preservative from the membrane. Afterwards the finished water will meet the specifications outlined in this utility patent for approximately 1500 gallons.

Figure 3:
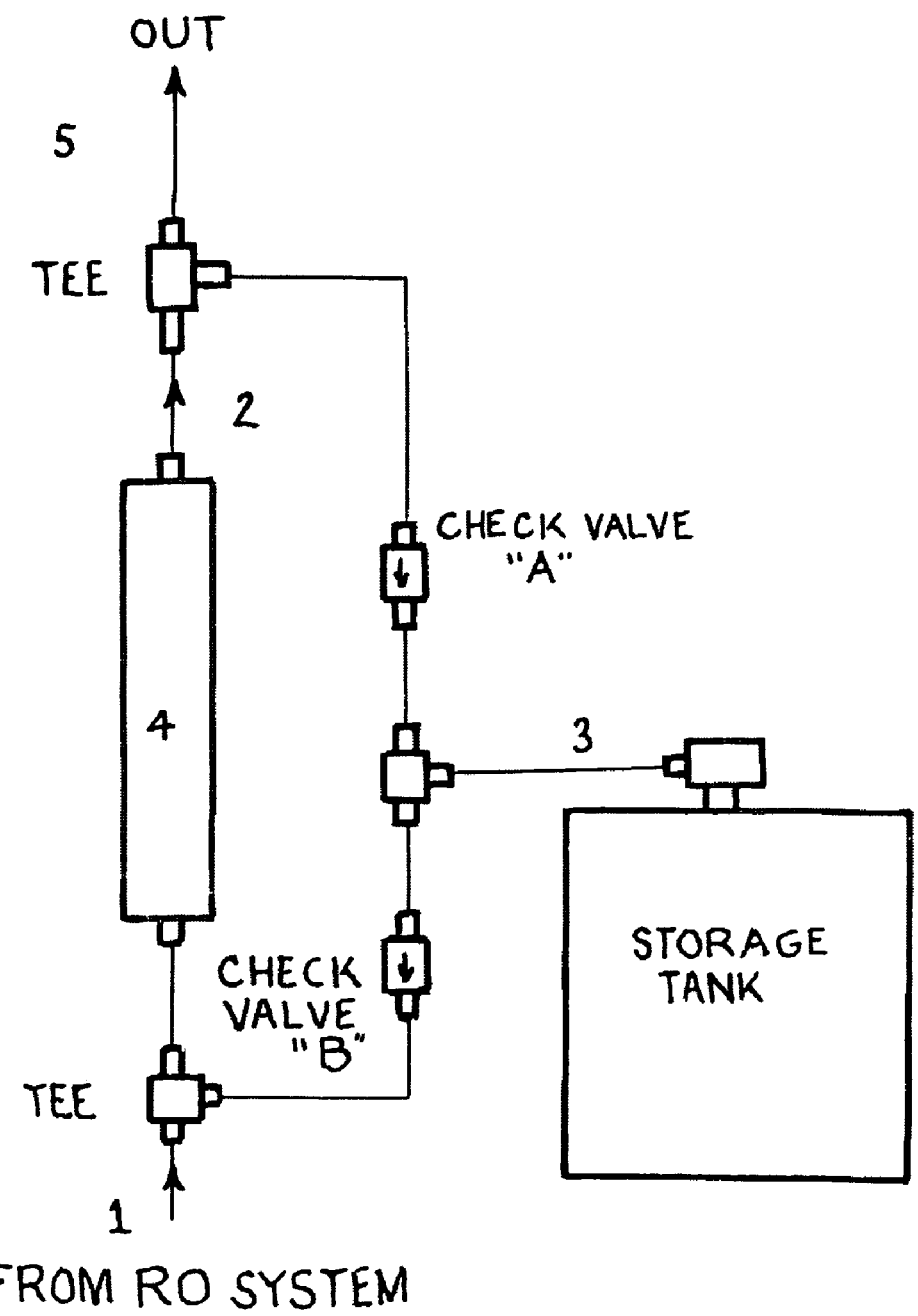
FIG. 3 shows the "Full Contact forced double remineralization" invention in isolation, with the exception that the remineralization filter and the storage tank from the earlier model are carried over. The following is the detail description FIG. 3 showing flow process claims 012 and 013.

With reference to FIG. 3, a detailed description of the flow process is: Step 1: Water from RO system 1, pH 6.5 enters the carbon/remineralization filter 4. Step 2: Water flows through the carbon/remineralization filter, and exits filter at 2 with pH 7.0. Step 3: Water flows through Check Valve "A" and line 3 into Storage Tank. Step 4: Upon demand, water flows from Storage Tank through line 3 and Check Valve "B" and enters the carbon/remineralization filter 4. Step 5: Water flows through the carbon/remineralization filter 4, and exits the water treatment system with pH 8.0. Check Valve "A" prevents the water from the Storage Tank from bypassing the carbon/remineralization filter upon demand. Instead it forces the water back through the carbon/remineralization filter a second time raising its pH from 7.0 to 8.0. Check Valve "B" prevents water from the RO system 1 (at pH 6.5) from going directly to the Storage Tank and by-pass the carbon/remineralization filter. Instead it forces the water to flow through the remineralization filter raising the pH.

Making the Invention: The Tap Master Artesian Full Contact is an evolution and an improvement of the Tap Master Artesian. The improvement consists of forcing the water through the remineralization filter a second time and thus this section will be confined to the improvement. However it is worth noting that the Tap Master Artesian and Tap Master Artesian Full Contact are modular filter based reverse osmosis systems, distinctly different from canister filter based reverse osmosis systems, in their components, method of assembly, and benefits to the end user.

The addition of the Full Contact components to the Tap Master Artesian is what makes the Tap Master Artesian Full Contact effective and distinct. These components are simple and few but their impact is substantial. The components are: two, ⅜" check valves; one 3' length of tubing cut into sections; and two, ⅜" tee fittings. Please see FIG. 3 for an illustration of the Full Contact components. Please note: this system can be built with either smaller diameter or larger diameter components—⅜" fittings are used here for consistency, however a ¼" Tap Master Artesian Full Contact system will be built. Using ¼" fittings will produce water with a slightly higher pH because of the slower flow rate through the remineralization filter and the increased contact time with the remineralization filter media.

On the previous model—the Tap Master Artesian—the water would leave the remineralization filter after a single contact, with a pH 7.0 on average and then be dispensed from the faucet. Within the Tap Master Artesian Full Contact, the water is diverted after the first contact with the remineralization filter, before the faucet, through a ⅜" tee fitting through a section of ⅜' tubing and through a ⅜" check valve, into a ⅜" tee fitting which connects to the storage tank and also back into the system. Without that check valve the water would bypass the remineralization filter upon demand and travel directly from the storage tank to the faucet. Upon demand that check valve blocks the water flow up to the faucet and instead forces the water down through another check valve back into the system and through the remineralization filter another time to achieve Full Contact and raise the pH to 8.0 on average and the total dissolved solids to 60 parts per million on average. The addition of the second check valve on the section of ⅜" tubing located between the ⅜" tee, which is located before the remineralization filter, and the storage tank prevents the water from flowing directly into the storage tank and bypassing the remineralization filter before the first contact. See FIG. 3.

Using the invention: The Tap Master Artesian Full Contact produces purified and remineralized water for drinking, cooking, and making ice. It should be connected to a home or office break room kitchen cold water supply using potable municipal or well water. The system is mounted underneath a sink, and the finished purified and remineralized "Full Contact" water is dispensed through a separate, dedicated faucet mounted on the sink next to the main kitchen faucet. A separate hole may need to be drilled in the sink if an extra hole is not available. The user will open the faucet valve in the normal manner, and fill a cup, pot or other water safe receptacle and use the water for drinking, cooking or making ice. The Tap Master Artesian Full Contact can also be plumbed to a refrigerator's water and ice center, a stand-alone icemaker, a bottle-les water cooler, or a coffee maker that accepts a plumbed in water line.

The invention claimed is:

1. In a water treatment system having only one carbon/remineralization filter connected to a filter inlet line receiving RO-treated water from an RO treatment unit, a filter outlet line connected to the downstream side of the filter, and a water storage tank, the improvement comprising:
   1) a recirculation line in fluid communication with the filter outlet line and the filter inlet line;
   2) a first check valve in the recirculation line oriented to permit water to flow from the filter outlet line towards the storage tank; and
   3) a second check valve in the recirculation line oriented to permit water to flow from the storage tank towards the filter inlet line, wherein the storage tank is in fluid communication with the recirculation line at a point between the first and second check valves such that in use, water from the RO treatment unit must flow through the filter once before entering the storage tank, and water from the storage tank must flow through the same filter again in order to exit the water treatment system.

2. The water treatment system of claim 1 wherein the water exiting the system is alkaline.

3. The water treatment system of claim 2 wherein the pH of the RO-treated water is 6.2-6.8.

4. The water treatment system of claim 3 wherein the pH of the water exiting the system is 7.5-8.5.

5. The water treatment system of claim 1 wherein the filter is a modular filter.

* * * * *